(12) United States Patent
Kuratani et al.

(10) Patent No.: US 7,809,217 B2
(45) Date of Patent: Oct. 5, 2010

(54) LIGHT CONTROL ELEMENT

(75) Inventors: Yasuhiro Kuratani, Kyoto (JP); Hideya Horiuchi, Omihachiman (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/505,588

(22) Filed: Jul. 20, 2009

(65) Prior Publication Data
US 2009/0290829 A1 Nov. 26, 2009

Related U.S. Application Data

(63) Continuation of application No. PCT/JP2007/073695, filed on Dec. 7, 2007.

(30) Foreign Application Priority Data
Jan. 23, 2007 (JP) ............................. 2007-013139

(51) Int. Cl.
*G02F 1/035* (2006.01)
(52) U.S. Cl. .......................................................... 385/2
(58) Field of Classification Search ...................... 385/2
See application file for complete search history.

(56) References Cited

U.S. PATENT DOCUMENTS

| 4,262,994 | A | * | 4/1981 | Sheem | ........................... | 385/8 |
| 6,101,296 | A | * | 8/2000 | Tavlykaev et al. | ............... | 385/2 |
| 6,314,228 | B1 | * | 11/2001 | Korenaga et al. | ........... | 385/129 |
| 6,522,793 | B1 | * | 2/2003 | Szilagyi et al. | ................. | 385/2 |

FOREIGN PATENT DOCUMENTS

| JP | 05-196903 A | 8/1993 |
| JP | 07-021597 B2 | 3/1995 |
| JP | 07-056199 A | 3/1995 |
| JP | 2615022 B2 | 5/1997 |
| JP | 2635986 B2 | 7/1997 |
| JP | 09-243976 A | 9/1997 |
| JP | 08-020651 B2 | 3/1998 |
| JP | 11-326853 A | 11/1999 |
| JP | 2000-028979 A | 1/2000 |

OTHER PUBLICATIONS

Official Communication issued in International Patent Application No. PCT/JP2007/073695, mailed on Mar. 4, 2008.

* cited by examiner

*Primary Examiner*—Charlie Peng
*Assistant Examiner*—Eric Wong
(74) *Attorney, Agent, or Firm*—Keating & Bennett, LLP

(57) ABSTRACT

In a polarization-independent light control element operable at low voltage, optical waveguides are provided in an X-cut first substrate and control electrodes are disposed thereabove. Optical waveguides are provided in a Z-cut second substrate and control electrodes are disposed thereabove. The control electrodes of the first and second substrates are connected in series to each other in the propagation direction of light. This allows a transverse electric component and a transverse magnetic component to be efficiently controlled because of the incorporation of high electro-optical effects of the optical waveguides of the first substrate on the transverse electric component and high electro-optical effects of the optical waveguides of the second substrate on the transverse magnetic component.

7 Claims, 3 Drawing Sheets

LIGHT CONTROL ELEMENT

BACKGROUND OF THE INVENTION

1. Field of the Invention

The present invention relates to a light control element which includes optical waveguides provided in substrates having electro-optical effects and which act as a light modulator or an optical switch.

2. Description of the Related Art

It is difficult to modulate two or more planes of polarization with a conventional light control element including a single-crystal, such as a LiNbO$_3$ (lithium niobate) single-crystal, having an electro-optical effect because of the anisotropy of LiNbO$_3$. In order to solve this problem, for example, Japanese Patent 2615022 discloses a light control element including a plurality of optical waveguides which are arranged in the same plane and which have different functions. End surfaces of the optical waveguides are in contact with each other, so that light beams traveling through the optical waveguides are combined.

Japanese Unexamined Patent Application Publication No. 7-56199 discloses a waveguide-type optical switch that is a polarization-independent optical switch independent of the polarization of incident light.

The light control element disclosed in Japanese Patent 2615022 will now be described with reference to FIG. 1.

FIG. 1 is a perspective view of the light control element disclosed in Japanese Patent 2615022. The light control element is a light modulator that converts linearly polarized incident light into arbitrarily polarized light (elliptically polarized light). Two optical waveguides 3 and 4 are in contact with each other at crystal end surfaces 13 and 14 of optical waveguide substrates 1 and 2, respectively, and are optically combined with each other. The substrates 1 and 2 are made of single-crystalline LiNbO$_3$ and include the optical waveguides 3 and 4, respectively, formed by thermally diffusing titanium ions into surface portions of the substrates 1 and 2. The optical waveguides 3 and 4 have a slightly large refractive index. The orientations 11 and 12 of the substrates 1 and 2, respectively, form an angle of 45 degrees. Electrodes 5 and 6 and electrodes 7 and 8 are arranged at both sides of waveguide 3 and 4, respectively, and are supplied with predetermined voltages from power supplies 9 and 10, respectively, whereby light traveling through the optical waveguides 3 and 4 is modulated. Incoming light 17 entering the optical waveguide 3 through an end surface 15 of the substrate 1 is modulated differently in the optical waveguides 3 and 4 and then emitted from an end surface 16 of the substrate 2.

FIG. 2 is a plan view of an optical waveguide, disclosed in Japanese Unexamined Patent Application Publication No. 7-56199, acting as a waveguide-type polarization-independent optical switch. This optical waveguide includes a LiNbO$_3$ substrate 21, Ti-diffused LiNbO$_3$ optical waveguides 22, a switching positive electrode 23, a switching negative electrode 24, a thin-film wave plate insertion groove 25, a thin-film half-wave plate 26, and bonding wires 27 for connecting electrodes.

The wave plate is placed halfway through the waveguides and polarization is rotated by 90 degrees, thereby achieving an optical switch operating independently of polarization.

For the optical waveguide disclosed in Japanese Patent 2615022, a common configuration for connecting the substrates having a plurality of different functions is disclosed; however, no detailed configuration for enabling a low-voltage operation independently of polarization is disclosed.

In a configuration disclosed in Japanese Unexamined Patent Application Publication No. 7-56199, the ½-wave plate needs to be positioned halfway through the waveguides, which are light paths, and therefore there is a problem in that junctions therebetween have a large optical loss. Furthermore, there is a problem in that the extinction ratio is wavelength-dependent, because the rotation of polarization by the ½-wave plate is wavelength-dependent.

SUMMARY OF THE INVENTION

In view of the above problems, preferred embodiments of the present invention provide a polarization-independent light control element which is weakly wavelength-dependent and which is operable at low voltage.

A light control element according to a preferred embodiment of the present invention includes optical waveguides provided in substrates having electro-optical effects and control electrodes arranged to apply electric fields to the optical waveguides to control light propagating through the optical waveguides. The optical waveguides are disposed in each of a first substrate having an optical axis perpendicular or substantially perpendicular to both the direction normal to a surface thereof and the propagation direction of light and a second substrate having an optical axis to the direction normal to a surface thereof, the control electrodes are arranged such that the electric fields corresponding to optical axes are generated across portions of the optical waveguides of the first and second substrates, and the optical waveguides of the first and second substrates are connected in series to each other in the propagation direction of light.

The optical waveguides are arranged in each of the first and second substrates so as to have branch optical waveguide structures, the control electrodes are located above each of the first and second substrates, and the branch optical waveguides of the first and second substrates are connected to each other so as to define a Mach-Zehnder structure, whereby a light modulator or an optical switch is configured.

The ratio of the length of the control electrodes of the first substrate to the length of the control electrodes of the second substrate is determined depending on the electro-optic coefficients and field efficiencies of the first and second substrates, so that the modulation depths of a transverse electric (hereinafter "TE") component and transverse magnetic (hereinafter "TM") component of light propagating through the optical waveguides of the first and second substrates are substantially equal to each other. That is, operating points are matched to each other.

The first substrate preferably is an X- or Y-cut LiNbO$_3$ substrate, the second substrate is a Z-cut LiNbO$_3$ substrate, and the length of the control electrodes of the second substrate is about three times the length of the control electrodes of the first substrate, for example.

The second substrate has a small thickness and the control electrodes are oppositely arranged above the front and back surfaces of the second substrate along a waveguide region of a control section.

The thickness of the second substrate is preferably within a range from about 7 μm to about 15 μm and the ratio of the length of the control electrodes of the second substrate to the length of the control electrodes of the first substrate is preferably within a range from about 0.8 to about 1.3, for example.

The thickness of the second substrate preferably is about 9 μm, for example, and the length of the control electrodes of the second substrate is substantially equal to the length of the control electrodes of the first substrate.

The optical waveguides of the first and second substrates are connected to each other at a position where the difference in loss between the TE and TM components of light propagating through the optical waveguides of the first and second substrates is minimized.

The first substrate, which preferably has the optical axis perpendicular or substantially perpendicular to both the direction normal to the surface thereof and the propagation direction of light, and the second substrate, which has the optical axis to the direction normal to the surface thereof, are used and properties of the optical waveguides provided in the first and second substrates are incorporated with each other; hence, although the substrates are anisotropic in coefficient, the TE and TM components can be equally and efficiently controlled.

Since the first and second substrates are preferably assembled to have the Mach-Zehnder structure, the length of the control electrodes can be freely designed and modulation can be efficiently performed at the minimum operation voltage. Therefore, an element having a small length can be configured.

Since the ratio of the length of the control electrodes of the first substrate to the length of the control electrodes of the second substrate is preferably determined depending on the electro-optic coefficients and field efficiencies of the first and second substrates, the polarization dependence of an operation voltage can be eliminated.

The first substrate preferably is such an X- or Y-cut $LiNbO_3$ substrate (LN substrate), the second substrate is such a Z-cut $LiNbO_3$ substrate (LN substrate), and the length of the control electrodes of the second substrate is about three times the length of the control electrodes of the first substrate; hence, an element which has a simple configuration, which is operable at low voltage, and of which the operation voltage is independent of polarization is obtained.

Since the second substrate preferably has a small thickness and the control electrodes are oppositely arranged above the front and back surfaces of the second substrate along the waveguide region of the control section, the optical waveguides of the second substrate can have a small length and the operation voltage can be reduced at the same element length.

By keeping the thickness of the second substrate within a range from about 7 µm to about 15 µm and the ratio of the length of the control electrodes of the second substrate to the length of the control electrodes of the first substrate within a range from about 0.8 to about 1.3, for example, the operation voltage of the TE and TM components can be set substantially same. In that case, the field efficiencies of the optical waveguides of the second substrate can be increased within a range where an increase in light loss due to a reduction in substrate thickness is not caused.

Since the thickness of the second substrate preferably is about 9 µm, for example, and the length of the control electrodes of the second substrate is substantially equal to the length of the control electrodes of the first substrate, the field efficiencies of the optical waveguides of the second substrate can be increased within a range where an influence on a portion, such as a 3-dB coupler, having properties dependent on the substrate thickness is small.

Since the optical waveguides of the first and second substrates are connected to each other at a position where the difference in loss between the TE and TM components of light propagating through the optical waveguides of the first and second substrates is minimized, polarization-dependent loss (hereinafter referred to as "PDL") can be reduced.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

First Preferred Embodiment

A light control element, according to a first preferred embodiment, preferably functioning as a light modulator, for example, will now be described with reference to FIGS. 3 and 4.

Figure 1:
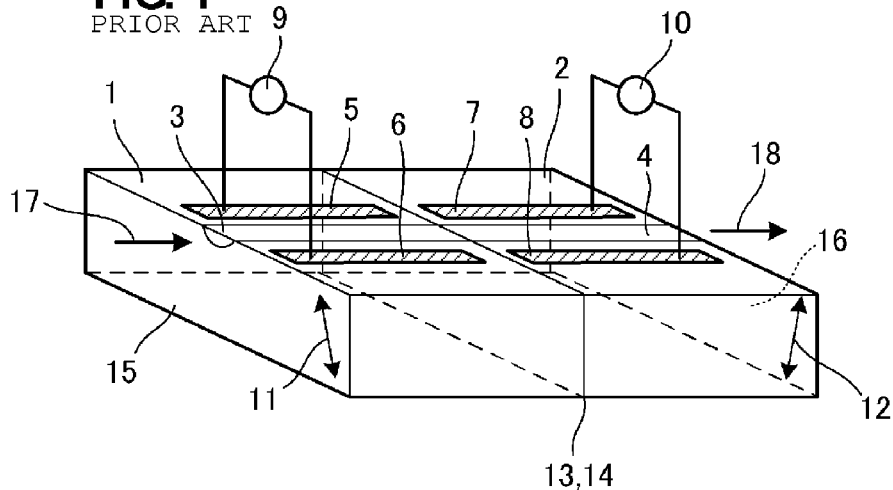
FIG. 1 is an illustration showing the configuration of a light control element disclosed in Japanese Patent 2615022.
Figure 2:
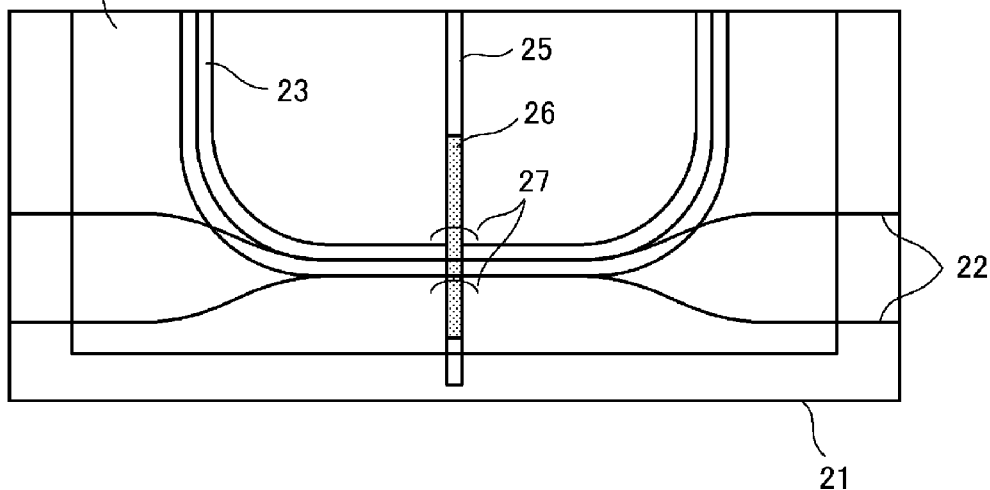
FIG. 2 is an illustration showing the configuration of a light control element disclosed in Japanese Unexamined Patent Application Publication No. 7-56199.
Figure 3:
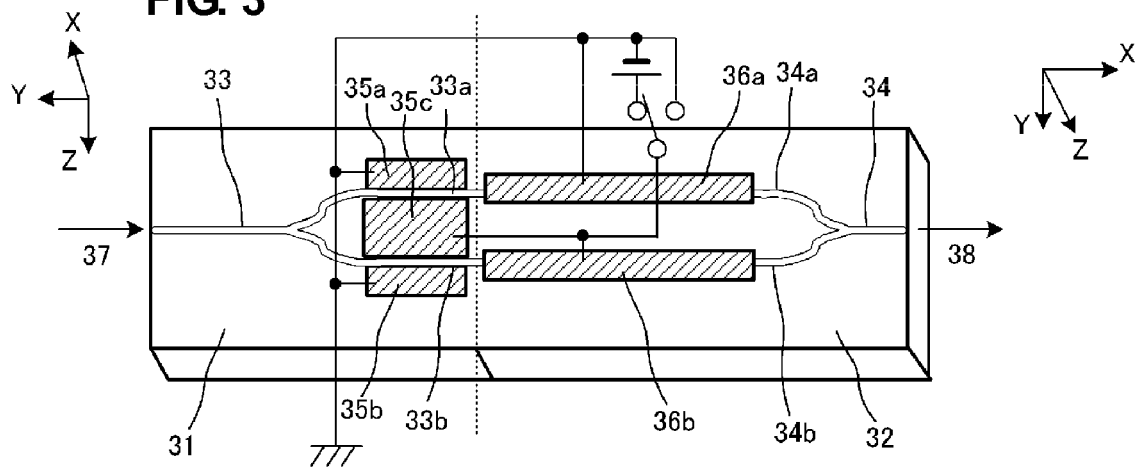
FIG. 3 is an illustration showing the configuration of a light control element according to a first preferred embodiment of the present invention.

FIG. 3 is an illustration showing the configuration of the light control element according to the first preferred embodiment. The light control element preferably includes two electro-optical and optical axis are mutually perpendicular or substantially perpendicular substrates (hereinafter simply referred to as "substrates"), that is, a first substrate and a second substrate. The first substrate 31 preferably is an X-cut single-crystalline $LiNbO_3$ (lithium niobate) substrate (hereinafter referred to as "LN substrate") and the second substrate 32 is a Z-cut LN substrate.

The first and the second substrates include optical waveguides 33, 33a, 33b, 34, 34a, and 34b and control electrodes 35a, 35b, 35c, 36a and 36b. The optical waveguides are cascade-connected to each other in the propagation direction of light.

The light control element shown in FIG. 3 is manufactured as described below.

The optical waveguides are formed in the first substrate 31 and the second substrate 32 by a process such as the thermal diffusion of metal ions so as to have desired shapes. The metal ions used are, for example, Ti ions, Zn ions, or the like. In particular, the optical waveguides are formed in such a manner that a Ti film having a width of about 7 µm, and a thickness of about 10 nm is formed by an ion beam-assisted deposition process and then subjected to thermal diffusion at approximately 1050° C. for about eight hours, for example.

The optical waveguide 33 and the branch optical waveguides 33a and 33b are disposed in the first substrate 31. The optical waveguide 33 is arranged to guide light incident on an incident port 37. The branch optical waveguides 33a and 33b equally branch from the optical waveguide 33 to define a Y-shape.

The branch optical waveguides 34a and 34b and the optical waveguide 34 are provided in the second substrate 32. The branch optical waveguides 34a and 34b are substantially symmetric to each other with respect to a junction surface between the first substrate 31 and the second substrate 32 and are connected to the branch optical waveguides 33a and 33b, respectively. The optical waveguide 34 joins with the branch optical waveguides 34a and 34b to define a Y-shape and combines light beams traveling through the branch optical waveguides 34a and 34b into a single beam, which exits from an exit port 38.

The propagation direction of light traveling through the optical waveguides of the first substrate 31 and that of light traveling through the optical waveguides of the second substrate 32 coincide with the Y-axis direction and the X-axis direction, respectively. After a $SiO_2$ buffer layer with a thickness of about 300 nm, for example, is formed on each of the substrates, the branch optical waveguides 33a, 33b, 34a, and 34b and electrodes 35a, 35b, 36a, and 36b of the first and second substrates 31 and 32 are formed. The electrodes are formed such that an electric field is efficiently generated in the optical axis direction (Z-axis direction) of each of the branch optical waveguides 33a, 33b, 34a, and 34b.

In particular, in the first substrate 31, the electrodes 35a and 35c are formed at positions sandwiching the branch optical waveguide 33a and the electrodes 35c and 35b are formed at positions sandwiching the branch optical waveguide 33b as shown in FIG. 3 such that an electric field is applied in the direction that is parallel or substantially parallel to a surface of the substrate and that is perpendicular or substantially perpendicular to the propagation direction of light. In the second substrate 32, the electrodes 36a and 36b are arranged above the branch optical waveguides 34a and 34b, such that an electric field is applied in the thickness direction of the substrate.

The electrodes 35a, 35b, and 35c preferably have a width of about 60 μm and a length of about 10 mm, extend in the propagation direction of light, and are arranged at intervals of about 2 μm, for example. The electrodes 36a and 36b preferably have a width of about 60 μm and a length of about 30 mm and extend in the propagation direction of light.

Voltages are applied to the electrodes 35a, 35b, and 35c such that when an electric field is applied to the branch optical waveguide 33a of the first substrate 31 in the +Z-direction, an electric field is applied to the branch optical waveguide 33b in the direction (the −Z-direction) opposite thereto. Voltages are applied to the electrodes 36a and 36b such that electric fields are applied to the branch optical waveguides 34a and 34b, which guide light from the branch optical waveguides 33a and 33b to the second substrate 32, in the same directions (the +Z- and −Z-directions for the branch optical waveguides 34a and 34b, respectively) as those of the electric fields applied to the first substrate 31. This configuration allows the phase modulation depth of light propagating through the first substrate 31 to be added to that of light propagating through the second substrate 32.

End surfaces of the substrates that define light incident and exit surfaces are formed by polishing or the like. An end surface of the first substrate 31 that has the branch optical waveguides 33a and 33b is aligned with an end surface of the second substrate 32 that has the branch optical waveguides 34a and 34b such that the branch optical waveguides are connected to each other. The resulting end surfaces of the first and second substrates 31 and 32 are connected in series to each other in the propagation direction of light.

Examples of a method for connecting the above substrates to each other include the following methods: a method in which the end surfaces of the first and second substrates 31 and 32 are brought into tight contact with each other and then fixed to each other by applying an adhesive to surroundings thereof, a method in which a space between the two substrates is filled with an transparent adhesive, and the like. In order to prevent light reflected by end surfaces of the substrates, an antireflective film is formed on each end surface. Alternatively, the end surface may be processed so as to be inclined at about five degrees to about eight degrees to the axis of light instead of forming the antireflective film on the end surface. This configures a Mach-Zehnder (MZ)-type modulator.

Figure 4A:
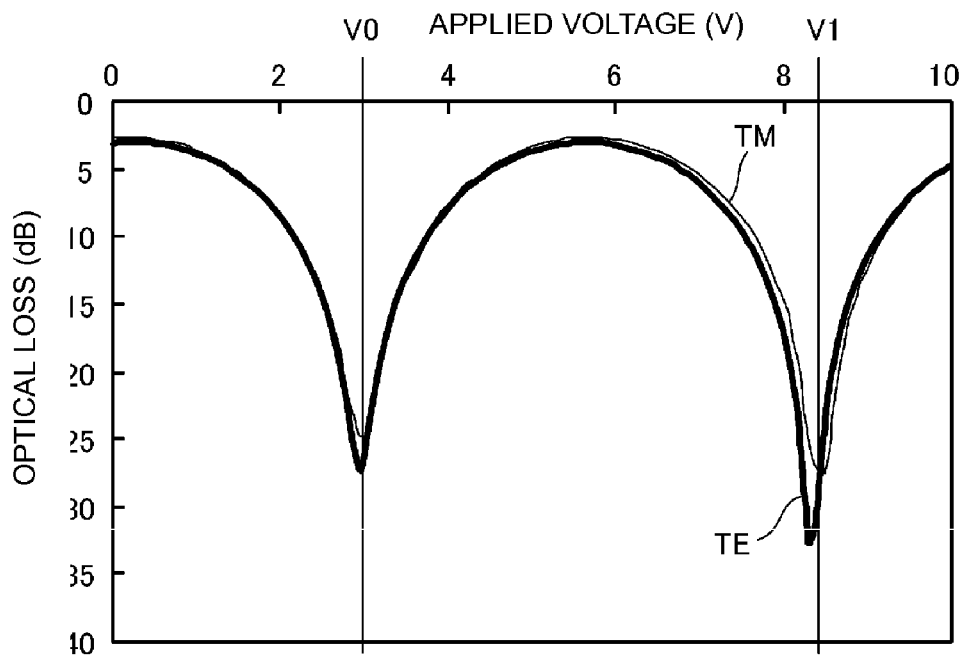
FIGS. 4A and 4B are illustrations comparatively showing light loss properties with respect to the voltage applied to a control electrode of a light control element according to a preferred embodiment of the present invention, and properties of a conventionally structured light control element.
Figure 4B:
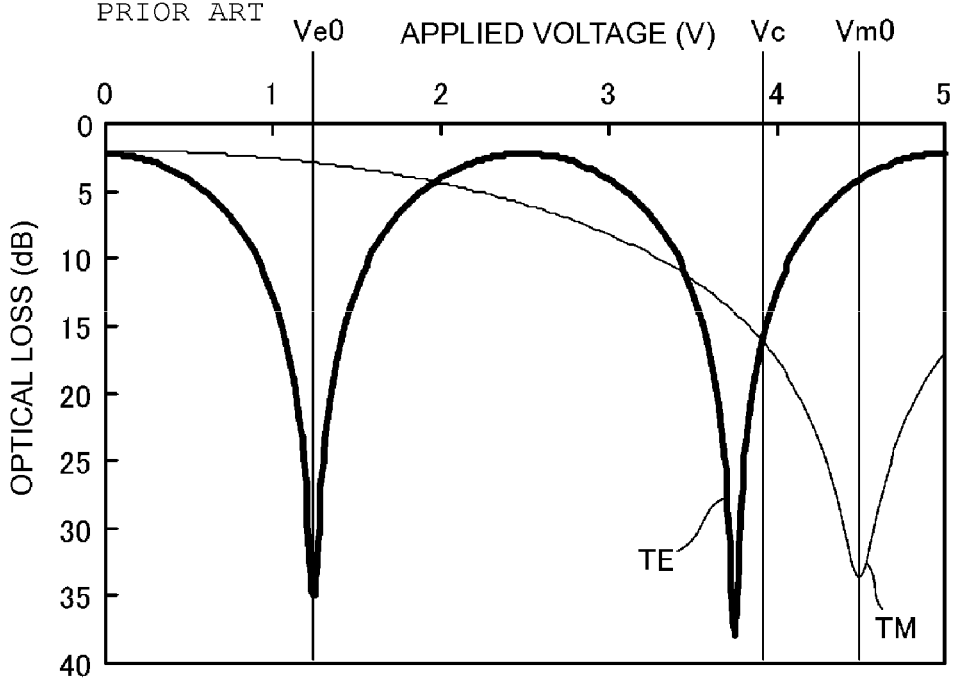

FIGS. 4A and 4B are illustrations comparatively showing properties (light loss properties with respect to the voltage applied to a control electrode) of the light control element shown in FIG. 3 and properties of a conventionally structured light control element. FIG. 4A shows properties of the light control element shown in FIG. 3. FIG. 4B shows properties of the conventionally structured light control element. The conventionally structured light control element includes optical waveguides which extend in a first substrate, which equally branch to define a Y-shape as shown in FIG. 3, and which join with each other and also includes electrodes which are similar to the control electrodes 35a, 35b, and 35c shown in FIG. 3 and which have a length of about 40 mm, for example. In order to compare the elements under the same electrode length condition, the sum of the lengths of these electrodes is set to be equal to that of the lengths of the electrodes arranged above the first and second substrates shown in FIG. 3.

In the light control element shown in FIG. 3, when the applied voltage is 0 V, light incident on the incident port 37 of the first substrate 31 is equally split into beams at a Y-shaped portion of the optical waveguide 33, the beams propagate through the connected end surfaces and the branch optical waveguides 34a and 34b in phase and are then combined into a single beam at a Y-shaped portion of the optical waveguide 34 with the intensities thereof being increased, and the beam is emitted from the exit port 38 with the intensity thereof being ideally equal to that of the incident light. The light loss thereof is about 3 dB as shown in FIG. 4A.

With the increase of the applied voltage from 0 V, the beams, which are equally split from light incident on the incident port 37 at the Y-shaped portion, are phase-modulated by electric fields while the beams are propagating through the branch optical waveguides 33a, 33b, 34a, and 34b. The directions of the electric fields applied to the beams propagating through the branch optical waveguides 33a and 33b are opposite to each other with respect to an optical axis. The beams propagating therethrough are phase-modulated in opposite directions and therefore are out of phase. The beams propagating through the branch optical waveguides 34a and 34b are also out of phase. The beams are combined into a single beam at the Y-shaped portion of the optical waveguide 34. When the phase difference between the beams propagating through the branch optical waveguides 34a and 34b is zero, the beam is output with the intensity thereof being increased. When the phase difference between the beams propagating therethrough is Π (opposite in phase), the beam is output with the intensity thereof being minimized (ideally zero) because the beams cancel each other out. Since the phase modulation depth thereof is proportional to the magnitude of the electric fields applied to the optical waveguides by the control electrodes, the intensity of the beam output to the exit port 38 varies periodically depending on a change in applied voltage as shown in FIG. 4A. In usual, the following voltage is preferably used: a voltage (half-wave voltage) V0 (about 3 V as shown in FIG. 4A) at which the output of the exit port 38 is first minimized. That is, light is switched on or off between two conditions: a 0 V application condition and a V0 application condition.

In the conventionally structured light control element, when the voltage applied to each control electrode is gradually increased from 0 V, the intensity of a TE component output from an exit port is minimized at a relatively low half-wave voltage Ve0 (about 1.3 V as shown in FIG. 4B) as shown in FIG. 4B and the intensity of a TM component output from the exit port is minimized at a relatively high half-wave voltage Vm0 (about 4.5 V as shown in FIG. 4B). In order to use this element as a polarization-independent light modulator, the following voltage needs to be used: a voltage Vc at which the light loss of the TE component is equal to that of the TM component. That is, light is switched on or off between two conditions: a 0 V application condition and a Vc application condition. Therefore, the extinction ratio thereof is up to about 15 dB.

Advantages of the light control element according to the first preferred embodiment will now be described in detail.

The phase modulation depth of the beams split at the Y-shaped portion of the optical waveguide 33 and then combined at the Y-shaped portion of the optical waveguide 34 is equal to the sum of the phase modulation depth of the beams propagating through the branch optical waveguides 33a and 33b of the first substrate 31 and the phase modulation depth of the beams propagating through the branch optical waveguides 34a and 34b of the second substrate 32 and is proportional to the electro-optic coefficient, electrode length, field efficiency, and applied voltage of each of the first and second substrates.

For example, a TE component of light is phase-modulated in the branch optical waveguides 33a and 33b with a modulation depth proportional to the electro-optic coefficient r33, electrode length Lx, applied voltage V, and field efficiency $\eta x$ of the first substrate 31 and then phase-modulated in the branch optical waveguides 34a and 34b with a modulation depth proportional to the electro-optic coefficient r13, electrode length Lz, applied voltage V, and field efficiency $\eta z$ of the second substrate 32.

Therefore, the phase modulation depth $\Delta\phi te$ of the TE component is represented by the following equation:

$$\Delta\phi te = (r33 * Lx * \eta x + r13 * Lz * \eta z) * V.$$

The phase modulation depth $\Delta\phi tm$ of the TM component, as well as the TE component, is represented by the following equation:

$$\Delta\phi tm = (r13 * Lx * \eta x + r33 * Lz * \eta z) * V.$$

Suppose the field efficiencies $\eta x$ and $\eta z$ are substantially equal to each other, an increase in Lx allows the phase modulation depth of the TE component to be relatively greater than the phase modulation depth of the TM component, and vice versa for an increase in Lz, because the electro-optic coefficient r33 of $LiNbO_3$ is about three times r13. Therefore, the proper adjustment of the ratio of Lx to Lz allows the phase modulation depths of the TE and TM components to be equal to each other, thereby enabling a polarization-independent operation.

In an electrode configuration shown in FIG. 3, the field efficiency $\eta x$ is about three times the field efficiency $\eta z$; hence, when the ratio of the electrode length Lz to the electrode length Lx is about 3 to 1, the modulation depth of the TE component coincide with the modulation depth of the TM component. In an example shown in FIG. 3, this condition is actually satisfied, that is, Lx=10 mm and Lz=30 mm; hence, the half-wave voltages of the TE and TM components are both about 3 V and coincide with each other.

It has been confirmed that the loss of a junction between the substrates can be reduced to about 1 dB or less. Therefore, lower loss properties can be achieved as compared to the light control element, which includes the half-wave plate, disclosed in Japanese Unexamined Patent Application Publication No. 7-56199.

In a junction between an incident or exit end surface of an optical waveguide formed in an LN substrate and a single-mode optical fiber, a TE mode and a TM mode are usually different in loss from each other. This is a cause of the PDL of an element. In various preferred embodiments of the present invention, when end surfaces of the first and second substrates are bonded to each other, the positional relationship between the first and second substrates varies depending on whether the loss of a TE or TM component is minimized. When the difference in loss between the TE and TM modes caused by the bonding of the end surfaces of the first and second substrates together is opposite to the difference in loss between the TE and TM modes caused by the bonding of the optical waveguide to the optical fiber and therefore the differences can compensate with each other, the PDL of the element can be reduced as compared to a configuration using a single substrate.

Second Preferred Embodiment

Figure 5:
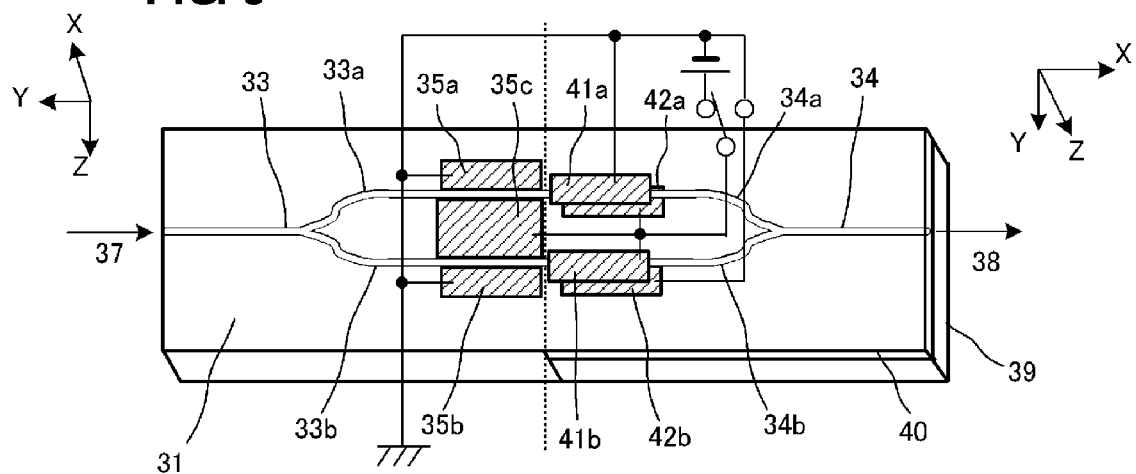
FIG. 5 is an illustration showing the configuration of a light control element according to a second preferred embodiment of the present invention.

FIG. 5 is an illustration showing the configuration of a light control element according to a second preferred embodiment. In the second preferred embodiment, the light control element includes a second substrate 40 with a small thickness and a support substrate 39 supporting the second substrate 40 as shown in FIG. 5. The second substrate 40 is configured such that branch optical waveguides 34a and 34b are sandwiched between control electrodes 41a and 41b disposed above the upper surface (front surface) thereof and control electrodes 42a and 42b disposed above the lower surface (back surface) thereof.

Since the second substrate 40 is thin, the second substrate 40 has a reduced strength and a junction between the second substrate 40 and a first substrate 31 has a small area and a reduced strength. Therefore, the support substrate 39 is attached to the lower surface of the second substrate 40 such that the sum of the thicknesses of the substrates is substantially equal to the thickness of the first substrate 31.

The support substrate 39 may be an arbitrary substrate and is preferably a substrate made of a material having a thermal expansion coefficient close to that of the second substrate 40 to maintain reliability. The support substrate 39, as well as the second substrate 40, is a Z-cut LN substrate.

The second substrate 40 preferably has a thickness of about 9 μm, for example. If the substrate, which has such a small thickness, is difficult to handle during the manufacture of the element, the substrate may be prepared by a procedure below. The following components are formed on or in a surface of a Z-cut substrate used to prepare the second substrate 40 in advance: an optical waveguide 34, the optical waveguides 34a and 34b; the optical waveguides 34, 34a, and 34b; a buffer layer extending between the optical waveguides 34, 34a, and 34b and the lower control electrodes; and the lower control electrodes 42a and 42b. After the resulting surface thereof is bonded to the support substrate 39 with an adhesive or the like, the second substrate 40 is polished, so that the second substrate has a desired thickness. The control electrodes 41a and 41b are arranged above a polished surface of the second substrate.

The lower control electrodes 42a and 42b of the second substrate 40 are connected through a side surface of the second substrate.

In the first preferred embodiment, the field efficiency of the second substrate, which is of a Z-cut type, is less than that of first substrate, which is of an X-cut type, and therefore the length of the control electrodes of the second substrate is preferably about three times the length of the control electrodes of the first substrate to allow the half-wave voltages of the TE and TM components to coincide with each other. In the second preferred embodiment, the second substrate has a reduced thickness and is vertically sandwiched between the control electrodes; hence, the field efficiency of the second substrate is high. Since the second substrate preferably has a thickness of about 9 μm, for example, the electric field of the second substrate is about three times that of the first preferred embodiment. The length of the control electrodes 41a, 41b, 42a, and 42b arranged above or below the second substrate may be about one-third that of the first preferred embodiment, thereby enabling substantially the operation as that of the first preferred embodiment. The length Lx of the control electrodes 35a, 35b, and 35c of the first substrate 31 and the length Lz of the control electrodes 41a, 41b, 42a, and 42b of the second substrate 40 preferably are both about 10 mm, that is, the total electrode length is about 20 mm. This short configuration, as well as that (the total electrode length is about 40 mm) described in the first preferred embodiment, is capable of achieving the properties (the operation voltages of the TE and TM components are both 3 V) shown in FIG. 4A. However, a conventional short configuration having an electrode length of 20 mm has an operation voltage that is twice that shown in FIG. 4B.

Since the field efficiency of the second substrate, which is of a Z-cut type, is thin and the control electrodes are arranged above or below the second substrate as described above, the same operation voltage allows the element to be shorter and the same element size allows a reduction in operation voltage. The structure, in which the first and second substrates are cascade-connected to each other, according to various preferred embodiments of the present invention has more remarkable improvements in efficiency as compared to conventional structures.

It is not preferred that the thickness of the second substrate be too small. When the thickness thereof is less than a certain value, the mode of light propagating through the waveguides varies and the propagation loss increases. Therefore, the substrate thickness has limits due to mode variation in addition to handling limits. When the thickness of an LN substrate is less than about 7 μm, for example, the mode of light propagating through a waveguide varies; hence, the second substrate 40 preferably has a thickness of about 7 μm or more.

Third Preferred Embodiment

Figure 6:
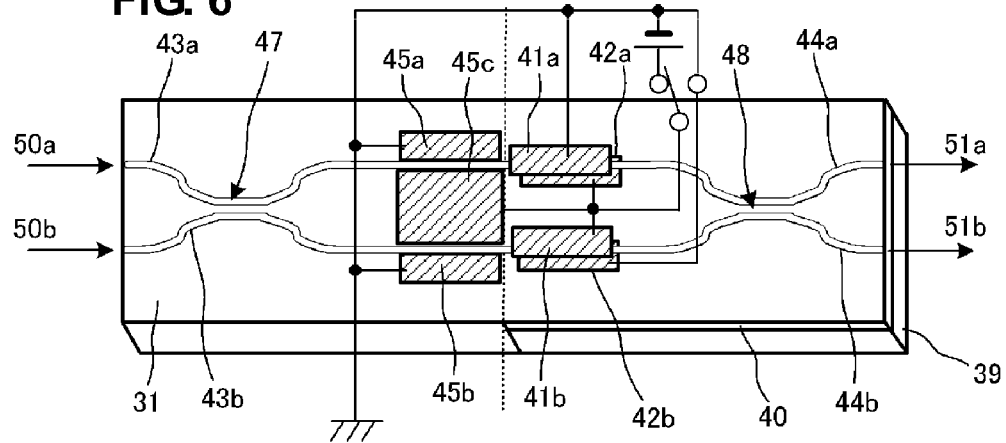
FIG. 6 is an illustration showing the configuration of a light control element according to a third preferred embodiment of the present invention.

FIG. 6 is an illustration showing the configuration of a light control element, acting as an optical switch, according to a third preferred embodiment. The configuration of a substrate preferably is the same as that described in the second preferred embodiment; however, an optical waveguide includes no Y-shaped branch but an interference-type 3-dB coupler.

When the voltages applied to control electrodes 45a, 45b, 45c, 41a, 41b, 42a, and 42b are 0 V (an applied voltage OFF-state), light incident on an incident port 50a of a first substrate 31 is equally split into beams by a 3-dB coupler 47. The beams propagate and are then combined into a beam by a 3-dB coupler 48 of a second substrate 40. The beam is output to an exit port 51a.

When the voltages applied thereto are predetermined ON-voltages (an applied voltage ON-state), light incident on the incident port 50a is equally split into beams by the 3-dB coupler 47. The beams are phase-modulated in control electrode-forming sections of the first and second substrates 31 and 40 depending on the applied voltages and the length of electrodes extending in the propagation direction of light and then combined by the 3-dB coupler 48 of the second substrate 40.

After the beams are combined by the coupler 48, the intensity of beams output to the exit port 51a and an exit port 51b periodically varies depending on the phase modulation depth achieved in the control electrode-forming sections. A voltage VS0 at which an output is first switched to the exit port 51b when the applied voltages are increased from 0 V is used to switch the path of light between two conditions: a 0 V application condition and a VS0 application condition.

An operation in which light is incident on an incident port 50b contrasts with the above operation. When the applied voltages are off, light incident on the incident ports 50a and 50b is directly output the exit ports 51a and 51b to turn into a bar state. When the applied voltages are on, paths are switched to the exit ports 51b and 51a to turn into a cross state. This enables a 2×2 switch operation.

In the third preferred embodiment, the operation voltage can be reduced and/or a polarization-independent operation can be performed in such a manner that substrates having different optical axis directions are combined with each other and the electrode length of each substrate is adjusted. This principle is substantially the same as those described in the first and second preferred embodiments. For an optical switch, switch crosstalk properties can be improved or a switch function with a large channel number can be achieved in such a manner that switch elements are cascade-connected to each other in the propagation direction of light such that a multistage structure is formed. A configuration including a common single substrate needs an extremely large electrode length to reduce the operation voltage. In order to switch a TM component of light in, for example, an X-cut substrate at 3 V, the electrode length thereof needs to be about 60 mm. Under restrictions on common inexpensive wafers with a diameter of about three or four inches, for example, it is difficult to form the multistage structure while realizing low operation voltage. An element including a plurality of substrates connected to each other has an extremely large size. The configuration of this preferred embodiment enables the switching operation of TE polarization and TM polarization at a total electrode length of about 20 mm; hence, the multistage structure can be readily obtained.

In the third preferred embodiment as well as the second preferred embodiment, the field efficiency of the second substrate 40 increases with a reduction in the thickness thereof. When the thickness of the second substrate 40 is about 9 μm or less, for example, properties of the 3-dB couplers shift from their original properties because of a change in the propagation mode of light; hence, the extinction ratio of the switch decreases. Therefore, in order to allow the second substrate 40 to have a thickness of about 9 μm or less, a design regarding such coupler property shifts due to a reduction in substrate thickness is preferable. In this case as well as the second preferred embodiment, when the substrate thickness is about 7 μm or less, the propagation loss of light is high.

Therefore, the substrate thickness of a Z-cut portion is about 7 μm or more and preferably about 9 μm or more in view of ease of design.

In particular, the thickness of the second substrate is preferably within a range from not less than about 7 μm to not more than about 15 μm because of a significant improvement in field efficiency, that is, a range from about 7 μm to about 15 μm. In addition, the ratio of the length of the control electrodes of the second substrate to the length of the control electrodes of the first substrate is preferably in a range from about 0.8 to about 1.3, whereby an increase in optical loss can be avoided and a low-voltage operation can be performed independently of the polarization of light.

Suppose $\Delta\phi te=\Delta\phi tm$ in the above two equations, the equation $Lz/Lx=\eta x/\eta z$ can be derived by rearranging the equations. The ratio $Lz/Lx$ represents the ratio of the length of the control electrodes of the second substrate to the length of the control electrodes of the first substrate. In order to allow the operation voltage of a TE component and that of a TM component to coincide with each other, the ratio $Lz/Lx$ is approximately equal to about 0.8 or about 1.3 when the thickness of the second substrate is about 7 μm or about 15 μm, respectively. This is because the value of the equation $Lz/Lx=\eta x/\eta z$ for a conventional structure including no thin substrate is approximately equal to 3; the field efficiency $\eta z$ is about 3.6 times that of the conventional structure and therefore the ratio $Lz/Lx$ is approximately equal to 3/3.6, that is, about 0.8 when the thickness of the second substrate is about 7 μm; and the field efficiency $\eta z$ is about 2.3 times that of the conventional structure and therefore the ratio $Lz/Lx$ is approximately equal to 3/2.3, that is, about 1.3 when the thickness of the second substrate is about 15 μm. As described above, the operation voltages of the TE and TM components are allowed to coincide with each other in such a manner that the ratio $Lz/Lx$ is adjusted within a range from about 0.8 to about 1.3 depending on the field efficiency, with the substrate thickness being within a range from about 7 μm to about 15 μm.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A light control element comprising:
optical waveguides provided in substrates having electro-optical effects and control electrodes arranged to apply electric fields to the optical waveguides to control light propagating through the optical waveguides; wherein
the optical waveguides are disposed in each of a first substrate having an optical axis perpendicular or substantially perpendicular to both a direction normal to a surface thereof and a propagation direction of light and a second substrate having an optical axis perpendicular or substantially perpendicular to a direction normal to a surface thereof, the control electrodes are arranged such that electric fields corresponding to optical axes are generated across portions of the optical waveguides of the first and second substrates, and the optical waveguides of the first and second substrates are cascade-connected to each other in the propagation direction of light; and
the optical waveguides are arranged in each of the first and second substrates so as to have branch optical waveguide structures, the control electrodes are located above each of the first and second substrates, and the branch optical waveguides of the first and second substrates are connected to each other to define a Mach-Zehnder structure so as to configure a light modulator or an optical switch.

2. The light control element according to claim 1, wherein a ratio of a length of the control electrodes of the first substrate to a length of the control electrodes of the second substrate is determined depending on electro-optic coefficients and field efficiencies of the first and second substrates, so that modulation depths of a transverse electric component and a transverse magnetic component of light propagating through the optical waveguides of the first and second substrates are substantially equal to each other.

3. The light control element according to claim 2, wherein the first substrate is an X- or Y-cut $LiNbO_3$ substrate, the second substrate is a Z-cut $LiNbO_3$ substrate, and the length of the control electrodes of the second substrate is about three times the length of the control electrodes of the first substrate.

4. The light control element according to claim 1, wherein the second substrate has a relatively small thickness compared to that of the first substrate, and the control electrodes are oppositely arranged above the front and back surfaces of the second substrate along a waveguide region of a control section.

5. The light control element according to claim 4, wherein a thickness of the second substrate is within a range from about 7 μm to about 15 μm and a ratio of a length of the control electrodes of the second substrate to a length of the control electrodes of the first substrate is within a range from about 0.8 to about 1.3.

6. The light control element according to claim 4, wherein a thickness of the second substrate is about 9 μm and a length of the control electrodes of the second substrate is substantially equal to a length of the control electrodes of the first substrate.

7. The light control element according to claim 1, wherein the optical waveguides of the first and second substrates are connected to each other at a position where a difference in loss between transverse electric and transverse magnetic components of light propagating through the optical waveguides of the first and second substrates is lowest.

* * * * *